US010685328B2

(12) United States Patent
Harris et al.

(10) Patent No.: US 10,685,328 B2
(45) Date of Patent: Jun. 16, 2020

(54) DYNAMIC NODES FOR MANAGING ORGANIZATION STRUCTURE

(71) Applicant: ADP, LLC, Roseland, NJ (US)

(72) Inventors: Phillip A. Harris, Bronx, NY (US); Daniel D. Kim, Plainview, NY (US)

(73) Assignee: ADP, LLC, Roseland, NJ (US)

( * ) Notice: Subject to any disclaimer, the term of this patent is extended or adjusted under 35 U.S.C. 154(b) by 837 days.

(21) Appl. No.: 14/636,948

(22) Filed: Mar. 3, 2015

(65) Prior Publication Data

US 2016/0260063 A1    Sep. 8, 2016

(51) Int. Cl.
*G06F 16/20* (2019.01)
*G06Q 10/10* (2012.01)
*G06F 16/28* (2019.01)
*G06F 16/23* (2019.01)

(52) U.S. Cl.
CPC ....... *G06Q 10/105* (2013.01); *G06F 16/2379* (2019.01); *G06F 16/282* (2019.01); *G06F 16/285* (2019.01)

(58) Field of Classification Search
CPC ......... G06F 17/30117; G06F 17/30215; G06F 17/30
USPC .......................................................... 707/807
See application file for complete search history.

(56) References Cited

U.S. PATENT DOCUMENTS

| 7,945,464 | B2 | 5/2011 | Homsi | |
| 8,560,970 | B2 | 10/2013 | Liddington | |
| 2001/0039544 | A1 | 11/2001 | Chakrabarti et al. | |
| 2001/0042063 | A1* | 11/2001 | Ebert | G06F 16/954 707/999.1 |
| 2006/0242122 | A1* | 10/2006 | DeVorchik | G06F 16/148 707/999.003 |

OTHER PUBLICATIONS

Mikutel, "Visualize your organization like never before in the new Visio", Aug. 20, 2012 3 11 pages.
Unknown, "Rich, Visual, Interactive Org Charts . . . Pro Versions", Dreamfactory.com, https://www.dreamfactory.com/orgview/index.html, first downloaded on Jun. 20, 2014, 5 pages.

* cited by examiner

*Primary Examiner* — Syed H Hasan
*Assistant Examiner* — Tracy M McGhee
(74) *Attorney, Agent, or Firm* — Alissa Pohlman; Andrew M. Calderon; Roberts Calderon Safran & Cole, P.C.

(57) ABSTRACT

Systems and methods for managing organizational structures are provided. The method of managing organizational structures includes visually representing an organizational structure with movable and definable nodes provided in a hierarchical format, which is generated in a user interface of a computing system. The method further includes mapping, within a database, relationships of the movable and definable nodes and information therein based on visual connections within the hierarchical format. The method further includes updating the database with newly mapped relationships between the movable and definable nodes as the movable and definable nodes are moved into different locations with respect to each other within the hierarchical format.

20 Claims, 15 Drawing Sheets

DYNAMIC NODES FOR MANAGING ORGANIZATION STRUCTURE

TECHNICAL FIELD

The invention relates to systems and methods of managing resources and, more particularly, to systems and methods for managing organizational structures.

BACKGROUND

An organization can be presented in many different formats. For example, an organization or company can be represented as an organization chart which graphically represents the management structure of an organization, such as relationships of managers and employees within a company. These organization charts are very useful as aids in assisting personnel from human resource to determine specific needs of the company.

To create an organization chart, a manager or administrator needs to filter through many documents and data to determine the current structure and needs of an organization. These organization charts are also static in nature, and will require a complete update even upon the occurrence of a single event, e.g., hiring of a new manager, a reassignment of personnel to a new department or division of the company, etc. This is a tedious and time consuming process, which is prone to mistakes and may not capture all of the necessary information. Also, the organization chart becomes ever more complicated and difficult to read and understand as more information is added to different levels of the chart.

SUMMARY

In a first aspect of the invention, a method of managing organizational structures comprises visually representing an organizational structure with movable and definable nodes provided in a hierarchical format, which is generated in a user interface of a computing system. The method further comprises mapping, within a database, relationships of the movable and definable nodes and information therein based on visual connections within the hierarchical format. The method further comprises updating the database with newly mapped relationships between the movable and definable nodes as the movable and definable nodes are moved into different locations with respect to each other within the hierarchical format.

In another of the invention, a computer system for modeling or building an organizational structure comprises a hardware memory device that stores program instructions and a processor that executes the program instructions and causes the computer system to: represent a position, a person or an organization as a node in a hierarchical format on a user interface, which is representative of the organizational structure; build the organizational structure by permitting drag and drop actions of library elements into the hierarchical format as new nodes or updating existing nodes; and view the organization structure from a plurality of perspectives as relationships between the nodes, wherein the plurality of perspectives include formal and informal relationships represented by connections of the nodes within the hierarchical format.

In another of the invention, a computer program product comprises computer readable program instructions stored on non-transitory computer readable storage medium. The computer readable program instructions causing a computing device to: create movable and definable nodes in a hierarchical format using library elements stored in a database or entered by a user and which is representative of an organizational structure; visually represent the movable and definable nodes in a hierarchical format in a user interface of a computing system; map with a database relationships of the movable and definable nodes and the library elements based on visual connections of each of the movable and definable nodes within the hierarchical format; and update the database with new relationships between the movable and definable nodes as the movable and definable nodes are moved into different locations with respect to each other within the hierarchical format.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF ASPECTS OF THE INVENTION

Figure 1:
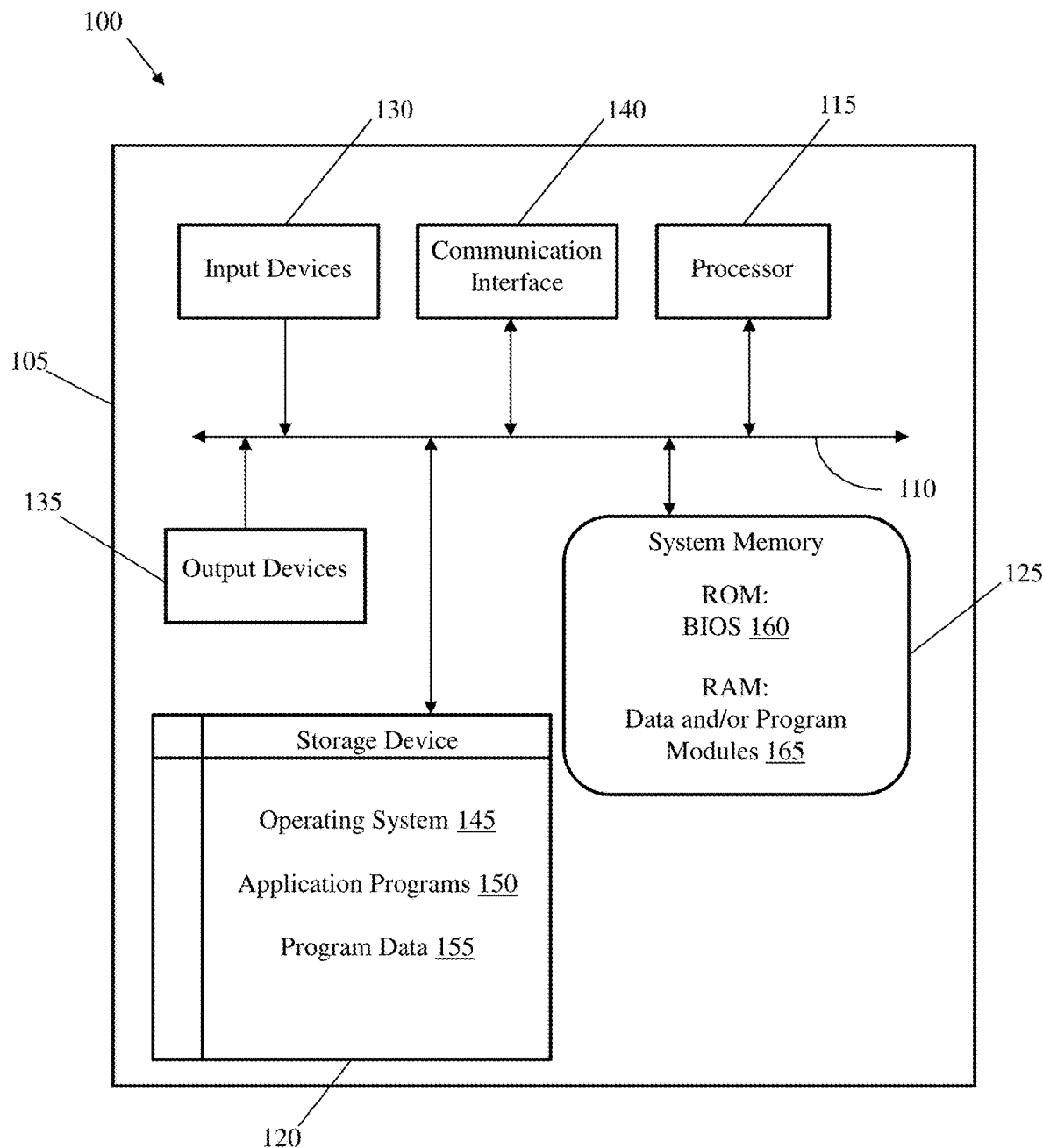
FIG. 1 is an illustrative architecture of a computing system implemented as embodiments of the present invention.

The invention relates to systems and methods of managing resources and, more particularly, to systems and methods for managing organizational structures. In more specific embodiments, the systems and methods described herein include work structure nodes for managing organizational structures which include work structure libraries and related library elements. The work structure nodes can encompass a visual representation of different objects, including people, skill sets, locations within an organization, employee positions and/or responsibilities, etc., to name a few examples. The work structure nodes can also be provided within a hierarchical format, with the additional ability to add and delete information or create relationships between such nodes and disparate information associated with an organizational structure as described further herein. This allows the information to be visualized, allowing the user to actually interact with the data behind the visualization, e.g., allowing for a unique, on fly data manipulation, through front end interactions.

In embodiments, the information populated within the work structure node, e.g., people, skill sets, locations within an organization, employee positions and/or responsibilities, etc., can be stored as structured libraries and library elements in a graph database. By using the graph database, it is now possible to obtain and create relationships between different types of information to create countless different organizational structures and relationships, etc., which otherwise was not available to the user.

Moreover, and as a further advantage, additional flexibility is provided to the user to create and navigate through visual representations (e.g., nodes) of work structures within an organization. For example, the methods and systems allow a user to create, add and define objects within a specified workspace and store those objects as defined nodes that can be rearranged by dragging and dropping into each other and into other places to create relationships, which are automatically updated within a graph database. In this way, the user can now interact directly with a user interface by drag and drop activities, and update relationships within an organizational structure without the need of tedious pages of forms and other bureaucracies that are prone to mistakes and, which cannot even provide the capabilities and relationships and other advantages provided by the systems and methods described herein.

Illustratively, the user can create new relationships, update relationships, delete existing relationships, etc. between people, positions, organizations, etc., by simply selecting a representation of a person, position or other object and dragging this representation to another person, position or other object (e.g., represented by another node) within a hierarchy or other format representative of an organization. By manipulating the user interface, or more specifically the nodes of the user interface, the user interface will automatically regenerate into a different user interface with updated information, e.g., relationships as described herein. These updated relationships will be automatically mapped in a database in correspondence with the visual representation of the nodes. The information in each node will also be updated in the database and mapped to specific library categories.

Moreover, the drag and drop capabilities will provide a seamless interaction for the user and hence provide a considerable savings in time and frustration to enhance hiring processes, gathering organization information and auto-populating a graph database with new information, e.g., relationships amongst different nodes. The user interface also advantageously provides an immediate visual display of the actual changes that are made, allowing for full interaction and engagement for the user.

FIG. 1 is an illustrative architecture of a computing system 100 implemented as embodiments of the invention. The computing system 100 is only one example of a suitable computing system and is not intended to suggest any limitation as to the scope of use or functionality of the invention. Also, computing system 100 should not be interpreted as having any dependency or requirement relating to any one or combination of components illustrated in computing system 100.

As shown in FIG. 1, computing system 100 includes a computing device 105. The computing device 105 can be resident on a network infrastructure such as within a cloud environment, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140. In embodiments, the storage device 120 can be a graph database, which includes structured libraries. In embodiments, the structured libraries can include organization information, e.g., people, skill sets, management structure, etc. and relationships within the organization.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more conventional processors or microprocessors that include any processing circuitry operative to interpret and execute computer readable program instructions, such as program instructions for controlling the operation and performance of one or more of the various other components of computing device 105. In embodiments, the processor 115 interprets and executes the processes, steps, functions, and/or operations of the present invention, which may be operatively implemented by the computer readable program instructions. In embodiments, the processor 115 can be implemented as separate, dedicated processors or a single dedicated processor to provide the functions of the systems and methods herein. In embodiments, the processor 115 may receive input signals from one or more input devices 130 and/or drive output signals through one or more output devices 135. The input devices 130 may be, for example, a keyboard or touch sensitive user interface (UI) as further described below. The output devices 135 can be, for example, any display device, printer, etc., as further described below.

By way of example, the processor 115 can model or build an organization structure, including representing a position, a person or an organization as a node in a hierarchical structure with respect to other nodes. In embodiments, the nodes (with the information within each node) can be dragged and dropped to any specific location within the hierarchical structure to create new relationships within the organizational structure. In this way, a user interface can provide a dynamic and changing visual representation of an organizational structure from a plurality of perspectives, including formal and informal work relationships, represented graphically by nodes. These nodes with corresponding information and any relationships between the nodes can be mapped within a database, e.g., storage device 120.

In more specific embodiments, the processor 115 can build or manage an organization structure by moving nodes (e.g., a second node) to an existing node (e.g., first node), representative of a parent, a child or a sibling to the first node. To provide these types of relationships, (i) the second node can be dropped on top of the first node when the second node is a parent of the first node, or (ii) the second node can be dropped at the bottom of the first node when the second node is a child of the first node, or (iii) the second node can be dropped at the same level of the first node when the second node is a sibling of the first node. In any of these embodiments, the first node and the second node can be defined as a person, a position or an organization, as examples, and their relationships mapped within a database.

The processor 115 can also create nodes and update information within the node using libraries of different categories and library elements (information) within the different library categories. The relationships between the libraries and their library elements can be mapped within a database. In embodiments, the libraries and library elements can be predefined, or created by the user with structured actions, as described herein.

As the processes of the present invention make it easy to create and alter relationships between objects (nodes populated with information), it is now possible to inter join disparate organizational information that would not otherwise be available or even make sense in a text or form format. This disparate organizational information can be stored in the storage device 120 (e.g., graph database) to generate additional relationships, build organization teams from the executive level downward, to manage resources, match certain skill sets within an organization and across different departments or divisions, etc. This information can then be displayed in a hierarchical format, etc. for ease of understanding and manipulation.

Accordingly, by being able to manipulate the objects (nodes) and relationships, dynamically and on the fly, it is possible to provide capabilities that were not otherwise available to the organization, e.g., management, human resources. For example, using the power of the graph database, e.g., the storage device 120, it is now possible to recommend certain people with certain skills within a department and from a specific location for a specific project within an organization, and match these people with people of similar skill sets or within a management hierarchy.

Still referring to FIG. 1, the storage device 120 may include removable/non-removable, volatile/non-volatile computer readable media, such as non-transitory media such as magnetic and/or optical recording media and their corresponding drives. The drives and their associated computer readable media provide for storage of computer readable program instructions, data structures, program modules and other data for operation of computing device 105 in accordance with the different aspects of the present invention In embodiments, storage device 120 may store operating system 145, application programs 150, and program data 155 in accordance with aspects of the present invention.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The one or more input devices 130 may include one or more mechanisms that permit an operator to input information to computing device 105, such as, but not limited to, a touch pad, dial, click wheel, scroll wheel, touch screen, one or more buttons (e.g., a keyboard), mouse, game controller, track ball, microphone, camera, proximity sensor, light detector, motion sensors, biometric sensor, and combinations thereof. The one or more output devices 135 may include one or more mechanisms that output information to an operator, such as, but not limited to, audio speakers, headphones, audio line-outs, visual displays, antennas, infrared ports, tactile feedback, printers, or combinations thereof.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to model and build organizational structures. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present invention. In additional or alternative embodiments, hardwired circuitry may be used in place of or in combination with the program instructions to implement the tasks, e.g., steps, methods and/or functionality, consistent with the different aspects of the present invention. Thus, the steps, methods and/or functionality disclosed herein can be implemented in any combination of hardware circuitry and software.

Figure 2:
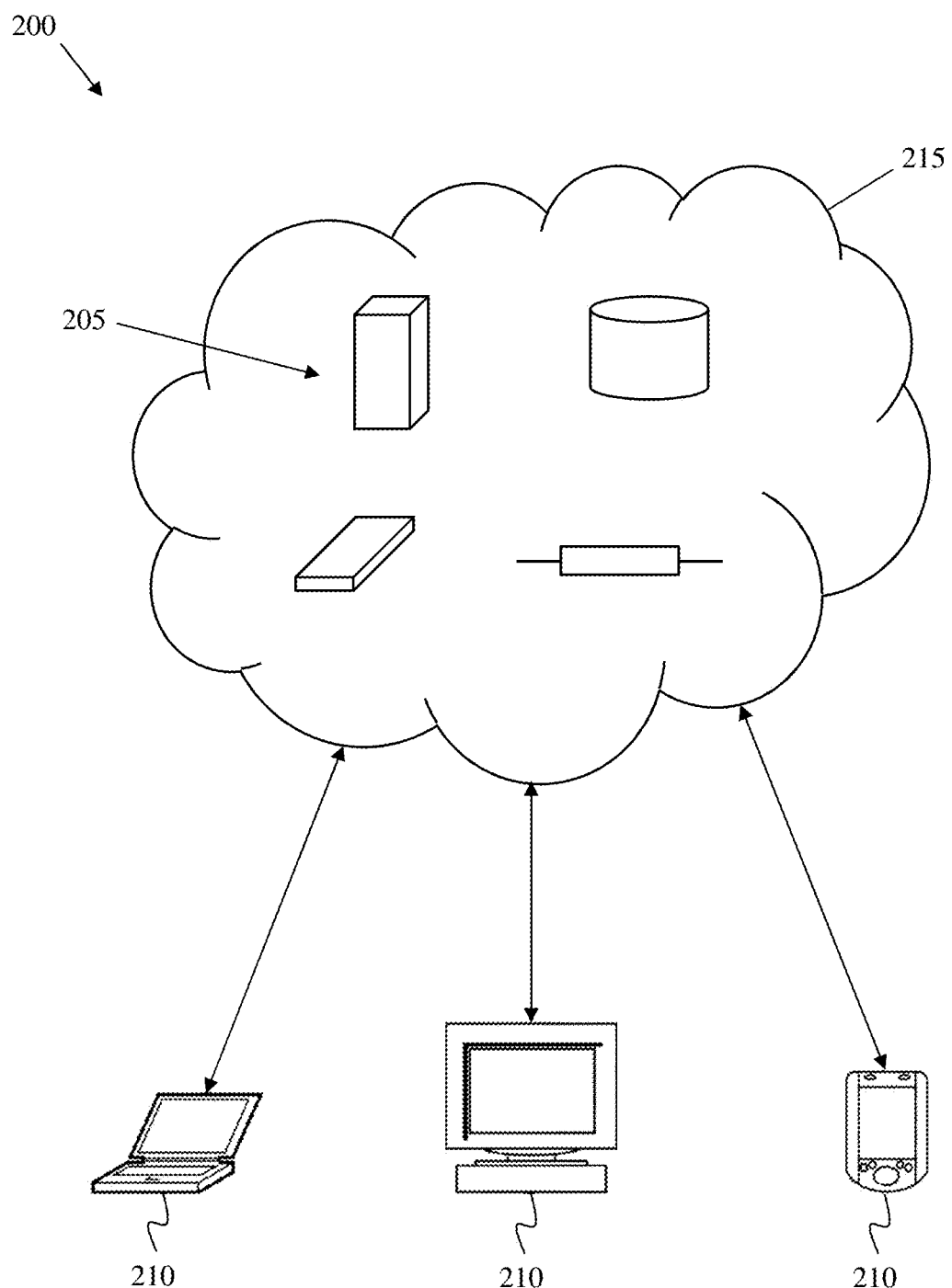
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may includes one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

One or more cloud resources 205 may be conceptually structured in multiple layers. In one example, the layers include a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

In another example, one or more cloud resources 205 may be conceptually structured in functional abstraction layers including a hardware and software layer, a virtualization layer, a management layer, and a workloads layer. The hardware and software layer may include hardware and software components such as mainframes, RISC (reduced instruction set computer) architecture based servers, storage devices, networks and networking components, application server software, and database software. The virtualization layer may include virtual entities such as virtual servers, virtual storage, virtual networks, virtual applications, and virtual clients. The management layer may provide functions such as resource provisioning, metering and pricing, security, user portals, service level management, and service level agreement planning and fulfillment. The workloads layer may provide functions for which the cloud computing environment is utilized, such as mapping and navigation, software development and lifecycle management, data analytics and processing, and transaction processing.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
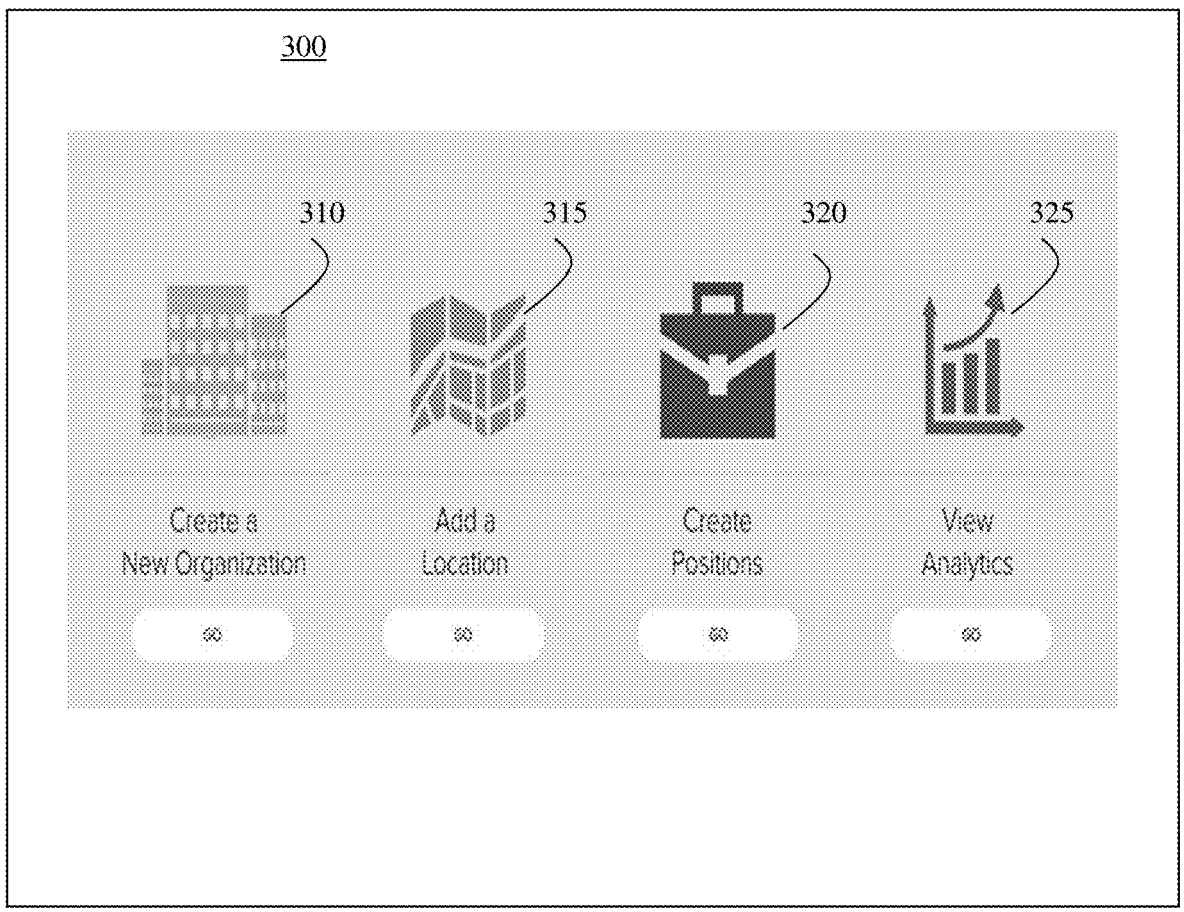
FIG. 3 shows a user interface associated with an administrator welcome page of an organization in accordance with aspects of the invention.

FIG. 3 shows a user interface associated with an administrator welcome page 300 of an organization. The administrator welcome page 300 is an illustrative, non-limiting example of a user interface which operates as a launching page to the various user capabilities and functionalities of the invention. For example, the various user capabilities and functionalities include the capability to model and build organizational structures, including, e.g., drag and drop functionality with the capability to automatically and dynamically change, generate, etc., relationships between different information represented within structured nodes (or objects within a user interface) defining skill sets, people, management structures, company relationships, etc. In embodiments, any of the example user interfaces (UI) described herein can use touch screens (e.g., by touching, swiping, etc.), keypad inputs, and/or mouse selection inputs to select icons, buttons, images, and/or any other selectable portion (e.g., nodes) of an example display.

By way of more specific example, the administrator welcome page 300 includes several icons 310, 315, 320, 325 which can be used to launch the user to different user interfaces as described herein. The several icons include, e.g., a new organization icon 310, add a location icon 315, create positions icon 320 or view analytics icon 330. It should be understood by those of skill in the art that these different icons 310, 315, 320, 325 are merely illustrative of numerous different icons and related operations and functionality which can be represented within the administrator welcome page 300. These different icons 310, 315, 320, 325 can launch the user to several different user interfaces having defined and undefined nodes provided, e.g., in a hierarchy or other relationship, as described herein.

FIGS. 4a-4d show representative defined and undefined nodes in accordance with aspects of the invention. In embodiments, the defined and undefined nodes provide the user with the ability to add, modify or delete information about a company, employee or relationships thereof, etc., as well as the ability to visually create different relationships amongst the information (nodes) by simple drag and drop capabilities by use of a drop and drag function 415, as further described with regard to FIGS. 6a, 6b and 7-9.

Figure 7:
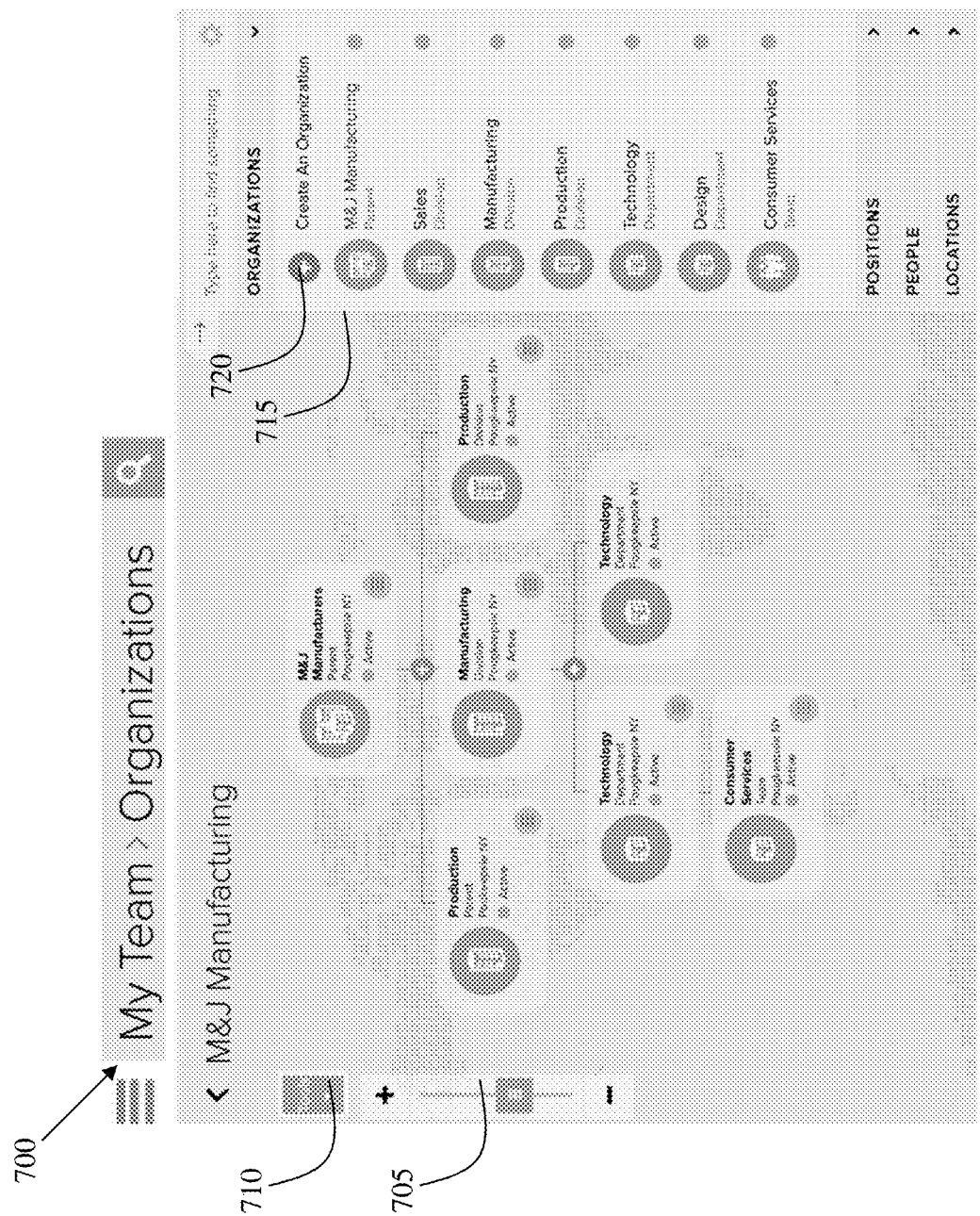
FIGS. 7-10 show exemplary user interfaces with particular libraries in accordance with aspects of the invention.

The nodes shown in FIGS. 4a-4d can be representative of many different organizational information including, e.g., company information, employee information, location information or a host of other categories which can be stored as a library in the graph database 120 of FIG. 1 (as described in more detail with regard to at least FIG. 7). In the examples described herein, the nodes shown in FIGS. 4a-4d are representative of corporate information viewable by the selection of the new organization icon 310; although, one of ordinary skill in the art would readily recognize that the nodes described herein can also be associated with positions, employees, etc., with similar underlying functionality as described herein.

Figure 4A:
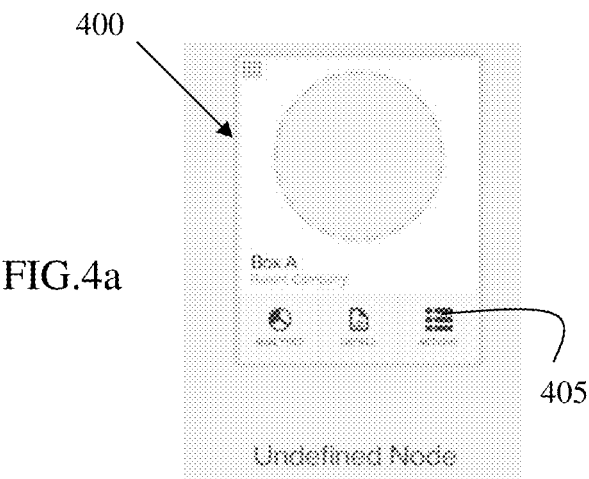
FIGS. 4a-4d are exemplary defined and undefined nodes used within an organization structure in accordance with aspects of the invention.

Referring to FIGS. 3 and 4a, by selecting the new organization icon 310, the systems and methods will launch the user (administrator) to an undefined node 400 as shown in FIG. 4a. This undefined node 400 can be used, as an illustrative example, to define company information, and can be positioned in a hierarchical relationship with other nodes as described with reference to at least FIGS. 6a and 6b. Similarly, other undefined nodes can be used to define employee information or other corporate or business information in a hierarchical or other relational format, etc., simply by selecting a different icon, e.g., create positions icon 320, within the administrator welcome page 300. In any scenario, the undefined node 400 provides the user with the ability to easily enter information related to the node, e.g., company information.

Figure 4B:
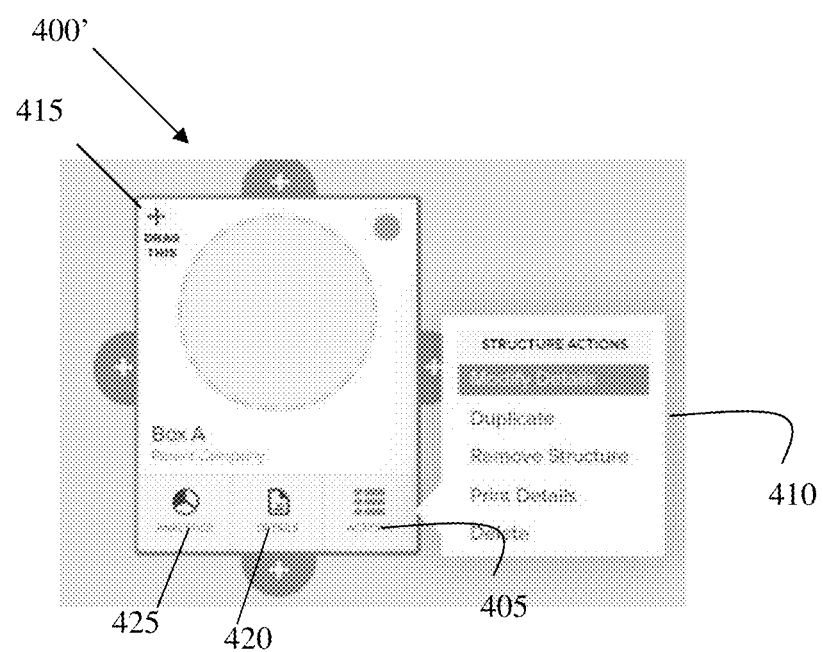

For example, as shown in FIG. 4b, the user can select the node "action" menu 405 of the undefined node 400' in order to enter, modify or delete information of an organization, e.g., employee information. The action menu 405 can also be used with defined nodes 400a', as shown in FIG. 4d. The action menu 405 provides the user with the ability to perform defined structured actions as shown in the menu 410 such as, for example, (i) modify details of the undefined or defined nodes,
(ii) duplicate the undefined or defined nodes,
(iii) remove certain structures of the undefined or defined nodes, e.g., different fields or information,
(iv) print details of the undefined or defined nodes, and
(v) delete the undefined or defined nodes from a hierarchical structure.

In additional or alternative embodiments, the menu 410 can include alternative or additional structured information, depending on the type of node. For example, a node associated with people (employees of a corporation) many include structured actions such as positions, show people, etc.

By way of further explanation, selection of the action "modify details" will allow a user to modify or create a defined node with details of the organization such as, for example, location name, address, company name, abbreviation, etc. By selecting the action "duplicate", the processes described herein can duplicate the details of an already existing node or portions thereof. In this way, the user need to only modify existing information in order to create a new node, compared to entering all common information again. By selecting the action "remove structure", the processes described herein can remove any desired structure or structures (e.g., defined information). By selecting the action "print details, the processes described herein can print the details of the organization or other information associated with a particular node. By selecting the action "delete", the processes described herein can delete the defined node 400', in its entirety.

Figure 11:
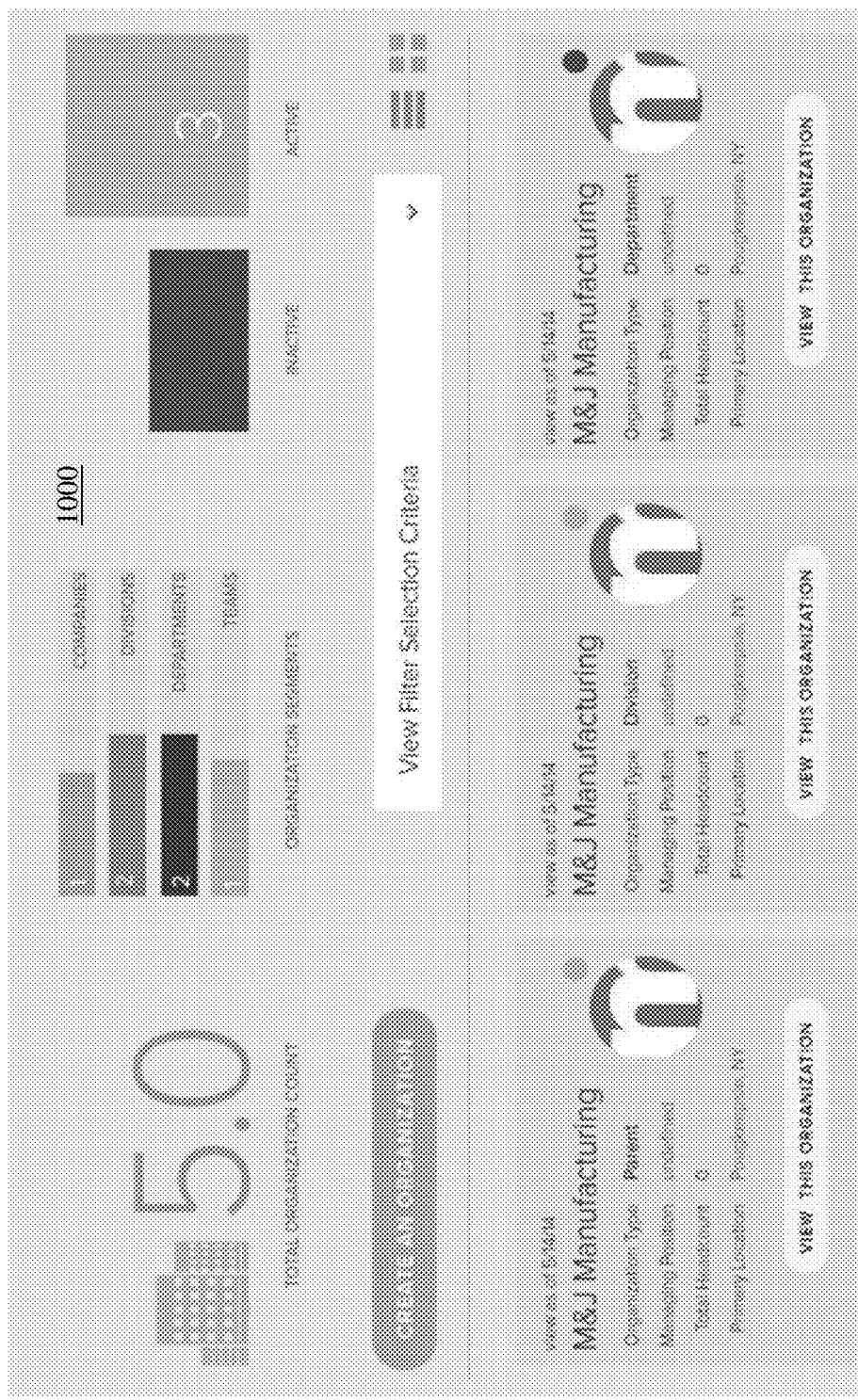
FIG. 11 shows an analytical view of information in a user interface in accordance with aspects of the invention.

The nodes shown in FIGS. 4a-4d can also include additional information. For example, the nodes can include a details menu 420 and an analytical or insight menu 425. In embodiments, other menus are also contemplated by the present invention. In embodiments, the details menu 420 can be selected to show additional information about each of the nodes, e.g., more granular information concerning the node such as corporate name, employee ID, etc. or other information provided in the fillable template described herein. The analytical or insight menu 425, on the other hand, can provide a high level analytical view of the information associated with each node as shown in FIG. 11. The analytics can include, for example, number of people in a corporation, number of divisions or departments with a corporation, number of active people within a division or department or other overview information shown in FIG. 11. In embodiments, this information can be displayed as a graph, chart, table, etc.

Figure 4C:
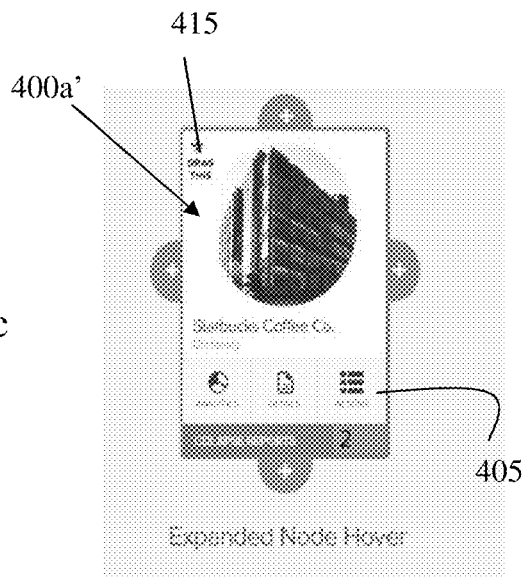
Figure 4D:
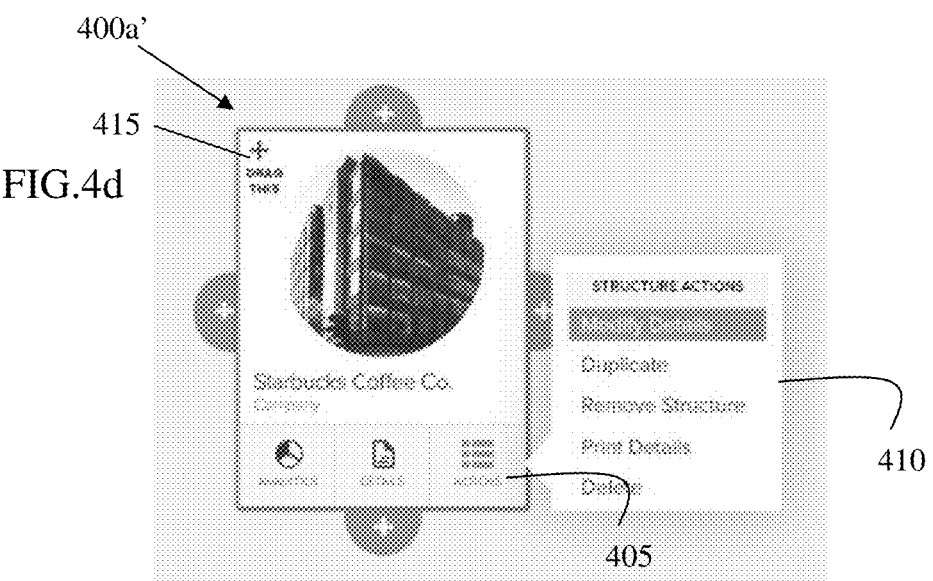

Referring more specifically to FIGS. 4b-4d, by selecting the "modify details" in the menu 410 of the undefined node 400' of FIG. 4b, information can be entered into the node by populating fillable fields of a template, including, e.g., company name, company abbreviation, description of the company, location name, address, ID information, etc. It should be understood by those of ordinary skill in the art that the user interface (UI) can also include other fillable fields associated with a particular employee or other business or organization information, depending on the required information associated with a particular node. By way of example, this information may include (i) person name, (ii) manager, (iii) description of employment, (iv) status, (v) ID information, (vi) address information, (vii) location name, amongst other information. Advantageously, any of this information can be saved, edited or deleted within the template, and can be mapped to a library category to create relationships amongst the different nodes. The information entered into each of the fillable fields may be mapped to the library categories and used at a later time for populating different nodes as described with respect to FIGS. 7-9. In alternate embodiments, the information can be predefined library elements which can be selected, dragged and dropped into a node as described with regard to FIGS. 7-9.

In any scenario, the entered information can be used to create a defined node 400a' as shown in FIGS. 4c and 4d. In addition to creating the defined node 400a', the information is also mapped into a graph database, e.g., storage system 120 of FIG. 1, which is used as a library of information for creating relationships with other nodes in accordance with the drag and drop capabilities of the invention. For example, by simply moving one node with respect to another node, the graph database, e.g., storage system 120 of FIG. 1, will automatically be updated to realize a new relationship between the nodes. Also, in embodiments, by manipulating the graphical representations of the library elements, e.g., entered information, it is also possible to create new relationships within and amongst the different nodes, as described in more detail with respect to FIGS. 6a, 6b and 7-9.

In embodiments, the nodes shown in FIGS. 4b-4d can be representative of a hover node, as shown by the "+" tabs on sides of the undefined node 400; although "−" tabs or a combination of "+" tabs and "−" tabs are contemplate by the present invention. For example, in FIG. 4b, the node is an undefined hover node 400', whereas, in FIGS. 4c and 4d, the nodes are defined hover nodes 400a'. In embodiments, the "+" tabs and "−" tabs allow the user to simply add or delete a row or relationship with respect to another node (also referred to as an entity) by a simple click or select action. For example, it is possible to add a row or relationship to a node in a hierarchical relationship (shown in FIGS. 6a and 6b, for example) by selecting the +/− tab on a node to either create a brand new object (node) and automatically create the needed relationship or create a new relationship to an existing object (node) (e.g., created a dotted relationships between two positions).

Figure 5A:
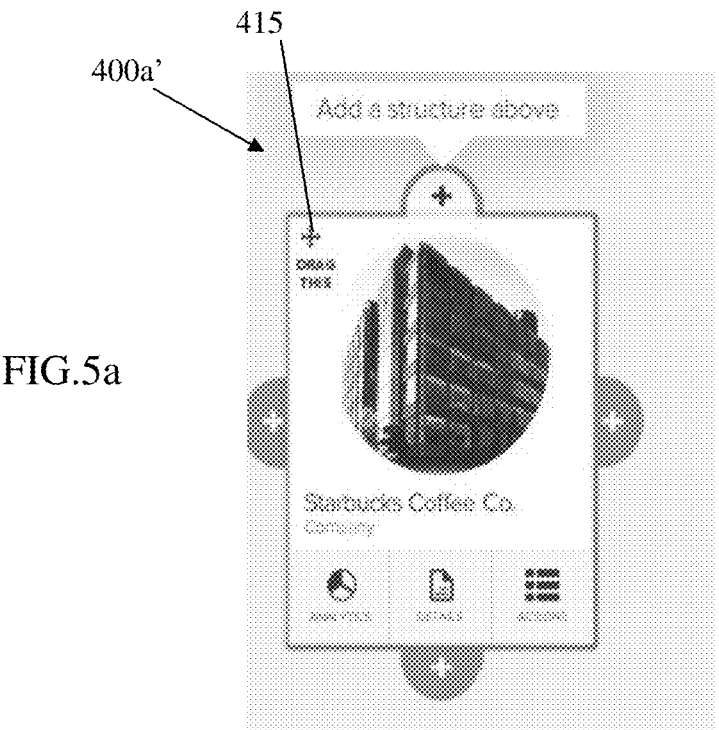
FIGS. 5a-5d are exemplary defined and undefined hover nodes used within an organization structure in accordance with aspects of the invention.
Figure 5B:
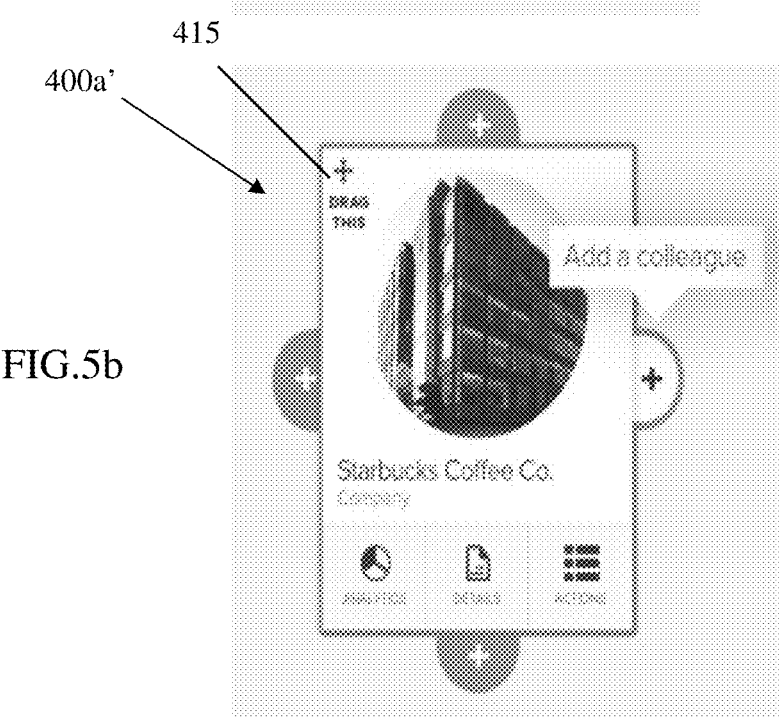
Figure 5C:

Referring to FIGS. 5a-5d, for example, the "+" tabs (e.g., hover tabs) provide the ability to add information with relation to the node 400a' such as, add a structure above, add a colleague or add a report. More specifically, as shown in FIG. 5a, by selection of the top "+" tab, the systems and methods of the invention allow the user to add a structure (e.g., node) above the node 400a'; whereas, selection of the side "+" tabs of FIGS. 5b and 5c allow the user to add a colleague (e.g., colleague node or other type of node, e.g., related corporate node, etc.) on respective sides of the node 400a', as shown in FIGS. 6a and 6b in a hierarchical relationship. The new top node can be a parent node; whereas, the side nodes can be sibling nodes. By adding these different nodes, the graph database, e.g., storage device 120 of FIG. 1, will be automatically updated with the relationships of the new nodes and the associated information related thereto.

Figure 5D:
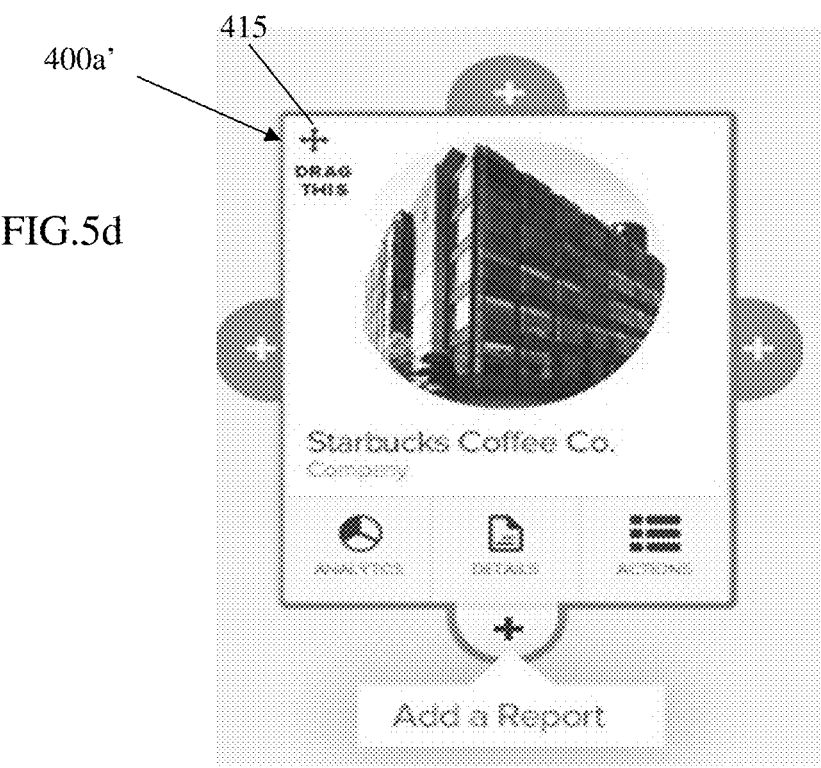
Figure 6A:
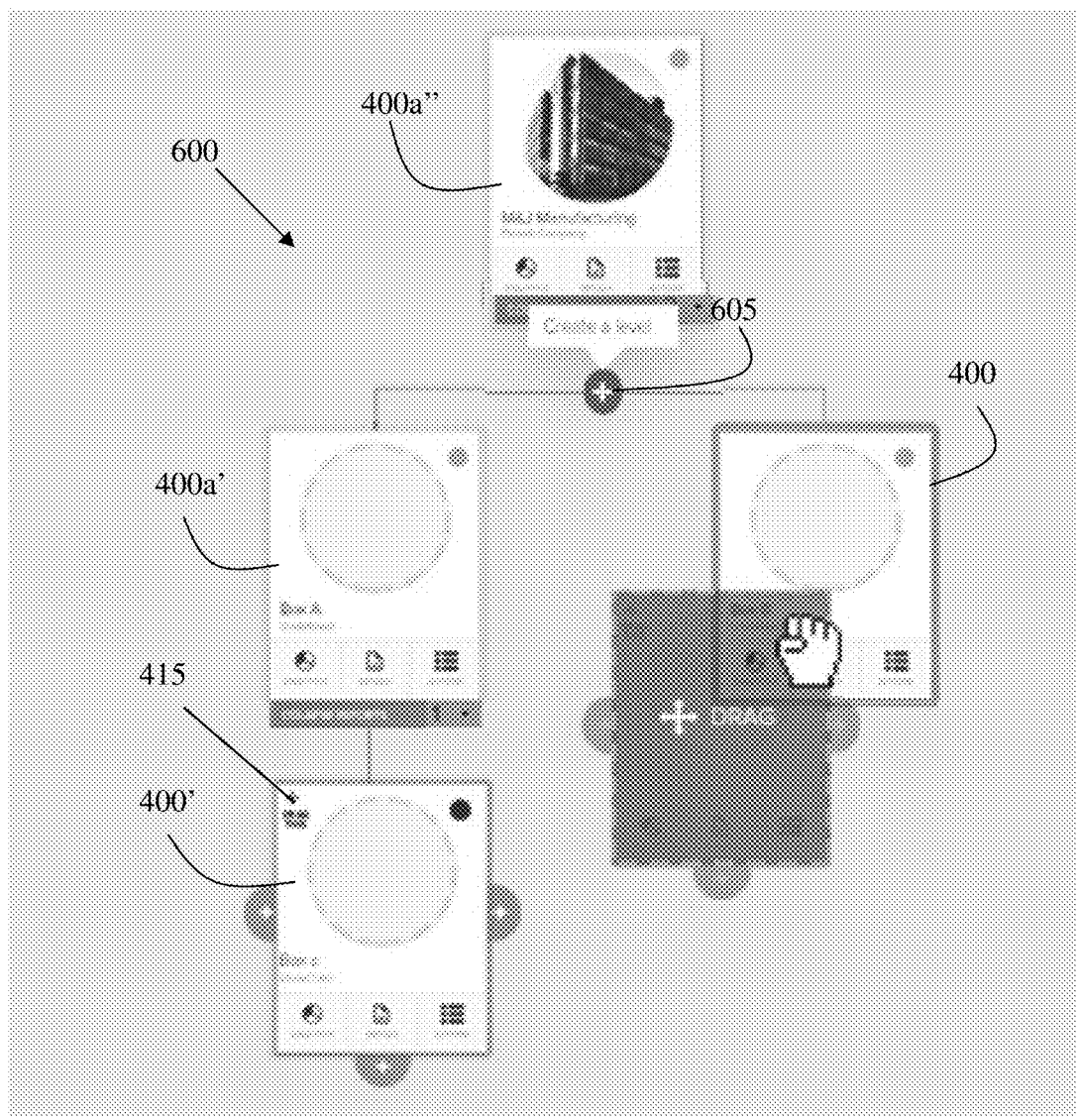
FIGS. 6a and 6b show exemplary user interfaces and underlying functionality in accordance with aspects of the invention.
Figure 6B:
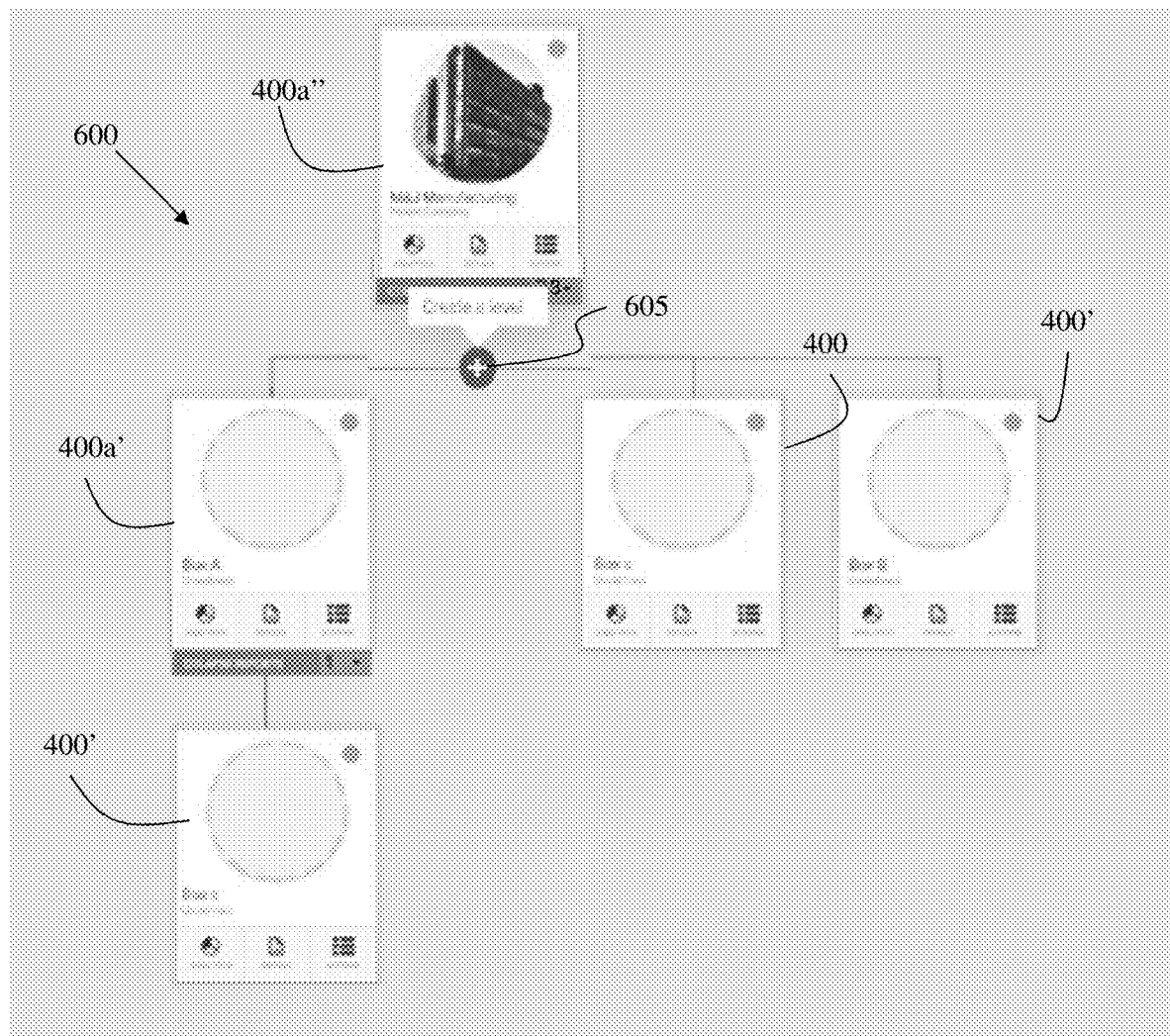

Also, selection of the bottom tab of FIG. 5d will allow the user to add a report, as an example. This report can be shown representatively in FIG. 11; although other formats and information are also contemplated by the present invention. It should be understood by those of skill in the art that the examples provided in FIGS. 5a-5d are only illustrative examples of defined nodes, and that other examples can also be provided by the processes and systems described herein. Once a new node and relationship is created, it can be saved in the graph database, e.g., storage device 120 of FIG. 1.

FIGS. 6a and 6b show exemplary user interfaces and underlying functionality in accordance with aspects of the invention. More specifically, FIGS. 6a and 6b can be representative of a corporate hierarchy 600 with related relationships between corporate entities; with defined node 400a" provided at a top of the hierarchical tree 600, undefined nodes 400 provided at a lower level and undefined hover node 400' provided at a lowest level as subservient relationships. In alternate embodiments, FIGS. 6a and 6b can be representative of a management hierarchy or other organizational hierarchy based on numerous different library categories defined in FIGS. 7-9, with related relationships between management or other personnel, etc. In any of these scenarios, the nodes can initially be set in a hierarchical relationship by the user, prior to being defined, and then manipulated into any position by a simple, select, drag and drop action to create different relationships (as shown in FIG. 6b) amongst the nodes, which will automatically be updated in the graph database, e.g., storage device 120 of FIG. 1.

By way of more specific example, the defined node 400a" can be representative of a corporation or a manager or other executive level position, e.g., CEO, whereas, the remaining nodes can be departments or divisions within the corporation or subsidiaries to the corporation, or alternatively direct reports to the manager or other executive level position within the corporate management hierarchy. Similarly, the exemplary user interfaces of FIGS. 6a and 6b can be representative of other hierarchies or organizational structures in accordance with aspects of the present invention. In this way, the defined node 400a" can be a parent node, with the remaining nodes being children nodes. When the nodes are on the same level of the hierarchical structure, they can be sibling nodes.

In embodiments, the defined node 400a" is populated with information related to a particular company as described herein; although other defined nodes are also contemplated by the present invention. The undefined nodes 400 can be created by simply selecting the "+" tab 605 below the defined node 400a". These undefined nodes 400 can then be populated with information to create defined nodes, as described herein, e.g., by using structured templates or predefined library elements as described in FIGS. 7-9. This populated information can be representative of different, related corporations, subsidiaries, wholly owned subsidiaries, departments within a corporation or other hierarchical relationships, any of which are shown representatively in FIGS. 6a and 6b. As the nodes are created, the information related to each node can be linked to other nodes and stored with their relationships within the graph database, e.g., storage device 120 of FIG. 1.

In embodiments, the relationships between the nodes can be changed by simply dragging and dropping a node to a different level or location within the hierarchy 600. For example, when a node is dropped on top of another node, it can then become a parent node. Similarly, in embodiments, when a node is dropped on a side of another node it can become a sibling node, depending on the particular policy of the systems and methods of the invention.

By way of more specific example, the undefined hover node 400' (which is initially subservient to the node 400a') can be moved to an upper level of the hierarchy 600 by selecting the drop and drag function 415 and moving the undefined hover node 400' to over the undefined node 400 in an upper level. In this way, the undefined hover node 400' will now be at a same level of the remaining undefined nodes 400, directly below the defined node 400a", as shown in FIG. 6b. Thus, the undefined hover node 400' is directly subservient to the defined node 400a" (e.g., parent node) and on a same level as the remaining undefined nodes 400, 400a' (e.g., sibling nodes). By making such a move, any information that is provided within the node and its relationships to other nodes in the hierarchy will be updated within the graph database, e.g., storage device 120 of FIG. 1.

In further embodiments, any remaining undefined nodes and the undefined hover node 400' can be populated with information in accordance with aspects of the invention as described herein. Once the information is populated, it can be saved within the graph database, e.g., storage device 120 of FIG. 1, with its links and relationships to other nodes within the hierarchy.

Accordingly and advantageously, the information for each node can be saved with a relationship to any of the other nodes. Also, the undefined nodes and defined nodes can be moved to any location to redefine a new relation to one another node within the hierarchy. This new relationship will then be saved within the graph database, e.g., storage device 120 of FIG. 1. This process not only provides a graphical representation of the nodes and their relationships, but makes it easier to create new relationships, etc., without the need to manually link or otherwise visualize and manipulate the data.

FIG. 6b further shows an expanded view of the node 400a', with hierarchical relationships represented by a reference numeral e.g., "1" and "3", respectively. In these examples, a user would understand that there is one additional lower level relationship for node 400a' and three lower level relationships for node 400a". Of course, it should be understood by those of skill in the art that other reference numerals can be used, depending on the levels of relationship below the respective node. Also, by selecting this action box, e.g., "1" or "3", it is possible to either expand or contract the hierarchical tree to the level of the selected node.

FIG. 7 shows another exemplary user interface 700 in accordance with aspects of the invention. In this user interface 700, several different organizational structures are shown in a hierarchical tree format for fictional company "M&J Manufacturing". This hierarchical tree 700 includes different levels of the corporation including, e.g., production and manufacturing capabilities, each on the same level of the structure, with technology and consumer services at lower levels of the hierarchical tree, related specifically to the manufacturing node. Initially, each node can include certain information such as, for example, a relation to the fictional parent company "M&J Manufacturing", e.g., division, parent, etc., a location of the particular division, etc., and whether it is active. By selecting the "zoom" scroll bar 705, it is possible to expand or contract the amount of information shown for each node or, alternatively, expand or contract the tree, itself. In addition, tool icon 710 provides the ability to print the information or export this information into other formats, including a word document or spreadsheet document, a mail application, etc.

FIG. 7 further shows a plurality of library categories 715 and related library elements (information). These library categories 715 can be pre-defined categories, populated with pre-defined information or information obtained by the user when they are populating any of the nodes using the fillable template. In the latter scenario, information entered by the user in the predefined structured fillable fields of the template can be automatically mapped to the library category (e.g., structured fillable field) for use with other nodes. In embodiments, the nodes in the hierarchical tree 700 are the selected library category, e.g., organizations. By selecting a different library category, library elements of the new library category (e.g., persons, positions, locations, etc.) can be used to populate the existing nodes by a select, drag and drop operation into the respective node. Alternatively, by selecting a different library category, the hierarchical tree 700 can automatically change to nodes of the new categories, such as the hierarchical tree format shown in FIG. 8 or 9.

Still referring to FIG. 7, in embodiments, the information obtained by the user can be defined directly within the categories by selecting, e.g., the "create" icon 720. Generally, the library categories include, for example, organizations, positions, people and locations; although, those of skill in the art would recognize that other pre-defined library categories can be implemented with the systems and methods of the invention. In embodiments, the library categories include predefined elements or information which can be used to create new nodes or populate the existing nodes with additional information by drag and drop operations. The information (elements) within the library categories 715 can also be defined by the user, when populating any of the nodes with the fillable fields, as saved within the graph database.

In FIG. 7, by drop and drag operations, it is possible to create new nodes within the specific category or populate any of the existing nodes in FIG. 7 (or any other nodes), with any of the information from the library categories 715, e.g., sales, manufacturing, production, etc., within the category "organization". By way of example, by selecting division information, e.g., "sales", it is possible to create a new node within the hierarchy by dragging and dropping the elements to within the organizational structure, with respect to any of the existing nodes. Also, by selecting and expanding the library category "locations", it is further possible to update location information for any of the existing nodes by a simple select, drag and drop action from the library element to a specific node. Similarly, by selecting and expanding the library category "positions", it is possible to update position information for any of the existing nodes by a simple select, drag and drop action from the library element to a specific node. Accordingly, by implementing the use of these library categories and/or elements a new node can be created or any of the existing nodes can be updated with new information from different library categories, e.g., new division information (e.g., "sales") by a simple select, drag and drop action of a library element in the library category to the specific node.

In embodiments, as the nodes are created, updated or modified with the library elements, the graph database, e.g., storage device 120 of FIG. 1, will be automatically populated with the information placed within any of the nodes and mapped to the specific libraries. In this way, not only will the new information be visualized, but such information can be mapped within the database with its links or relationships to other nodes. Thus, by a simple drag and drop action for any of the nodes, the new information placed within the node (or a newly created node) will follow with such node and any information and relationships thus created will automatically be updated within the graph database.

Figure 8:
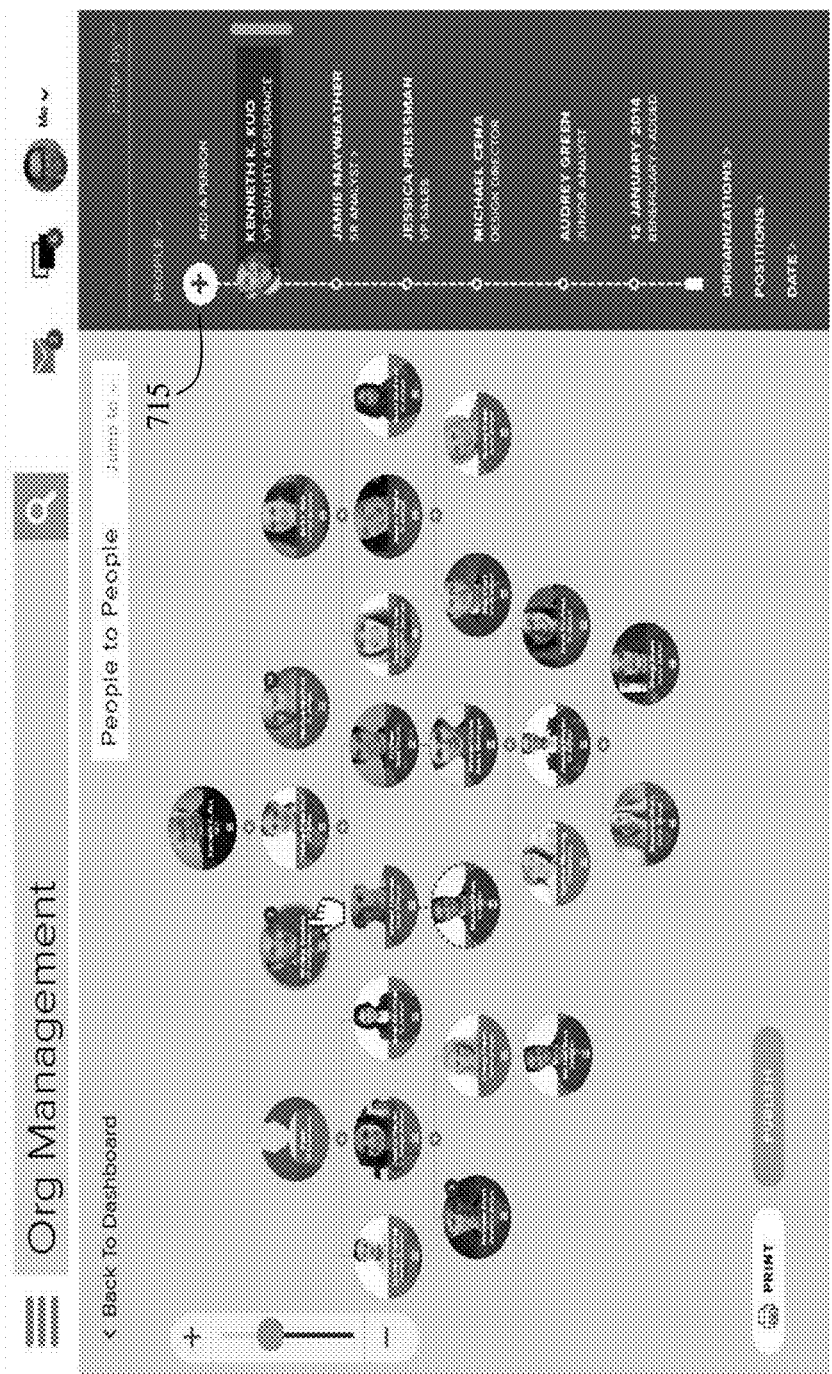

FIG. 8 shows another exemplary user interface with libraries in accordance with aspects of the invention. In this example, the selected library category 715 is "persons". As with FIG. 7, the user can select any of the library elements within the category, drag the elements into the organizational structure, and drop the library element with a specific location, whether it is within an existing node or to create a new node, in order to update the organizational structure. In this example, the user can change the library categories to further update an existing node with additional information, e.g., location of person, position of person, etc.

In FIG. 8, a solid line between the nodes represents a direct reporting relationship (e.g., formal relationship); whereas, a dashed line may represent an indirect working relationship (e.g., informal work relationships). These same structural relationships (dashed and solid lines) can be utilized with other categories such as company hierarchy (e.g., parent, subsidiary, division, department, etc.). In any event, any information of the new nodes or updated information within existing nodes will be mapped to the database with their respective relationships to other nodes in the hierarchy.

Accordingly, by implementing aspects of the invention, underlying data, e.g., new relationships, library elements, etc. will not only be visualized, but will populate the graph database. The new relationships within the graph database can then be used to find additional relationships and provide the ability to interact with the data that is being displayed. Also, it is now possible with the systems and methods to obtain more or less details of a specific entity (e.g., organization, user, product, position, skillset, etc.) by simply zooming in and out on a specific node. This is in comparison to the need to have separate pop-ups or links to different pages, which can be cumbersome and difficult to maintain visual relationships with other nodes.

Figure 9:
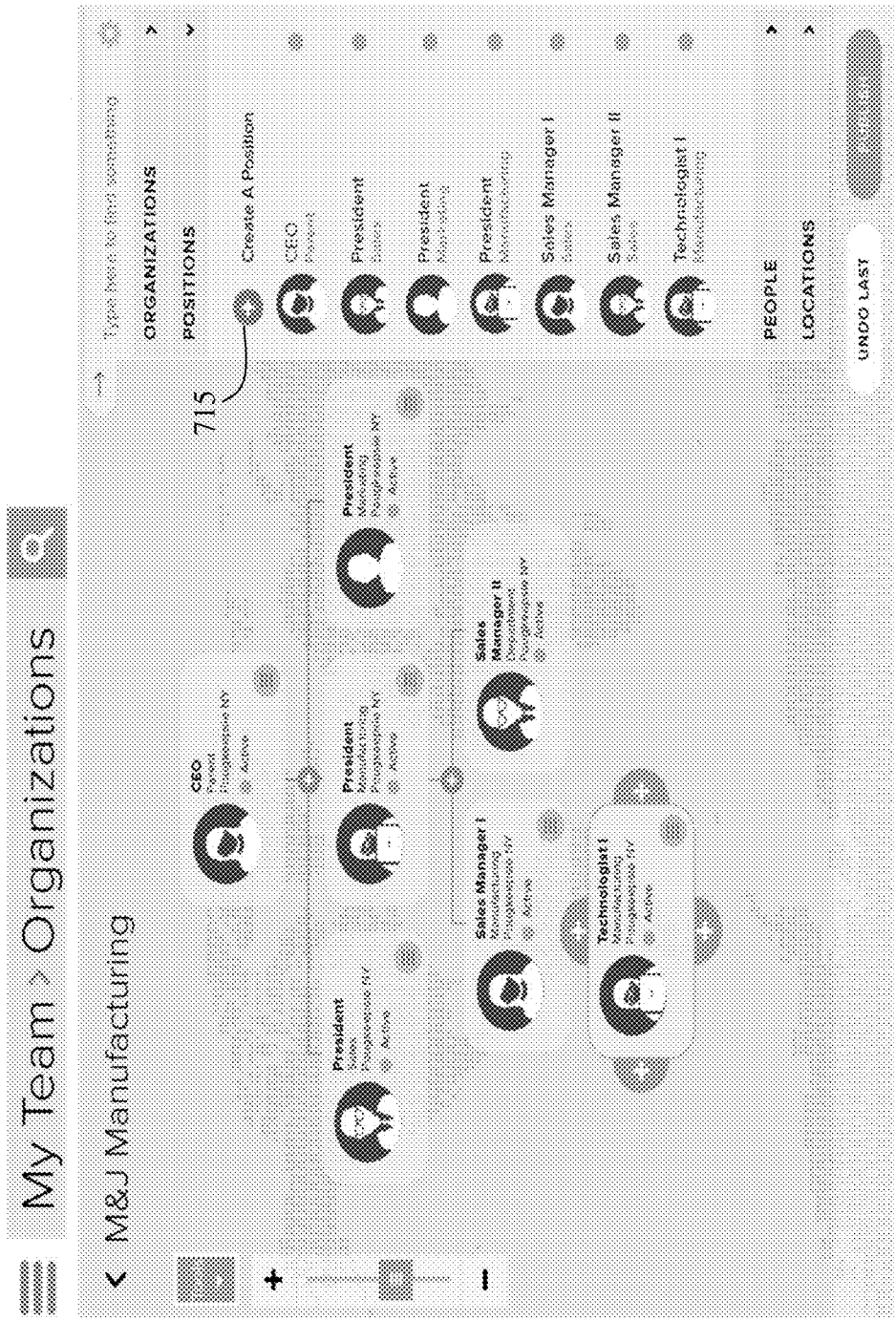

FIG. 9 shows another exemplary user interface in accordance with aspects of the invention. In this embodiment, the selected library category 715 is "positions". As with FIGS. 7 and 8, the user can select any of the library elements within the category, drag the elements into the organizational structure, and drop the library element with a specific location, whether it is within an existing node or to create a new node, to update the organizational structure. In this example, the user can select a particular position, e.g., CEO, President, etc., drag this element into any of the appropriate nodes in order to update the nodes. The new information within the node will automatically be mapped to the node and its other information corresponding to the shown visualization, within the graph database.

Figure 10:
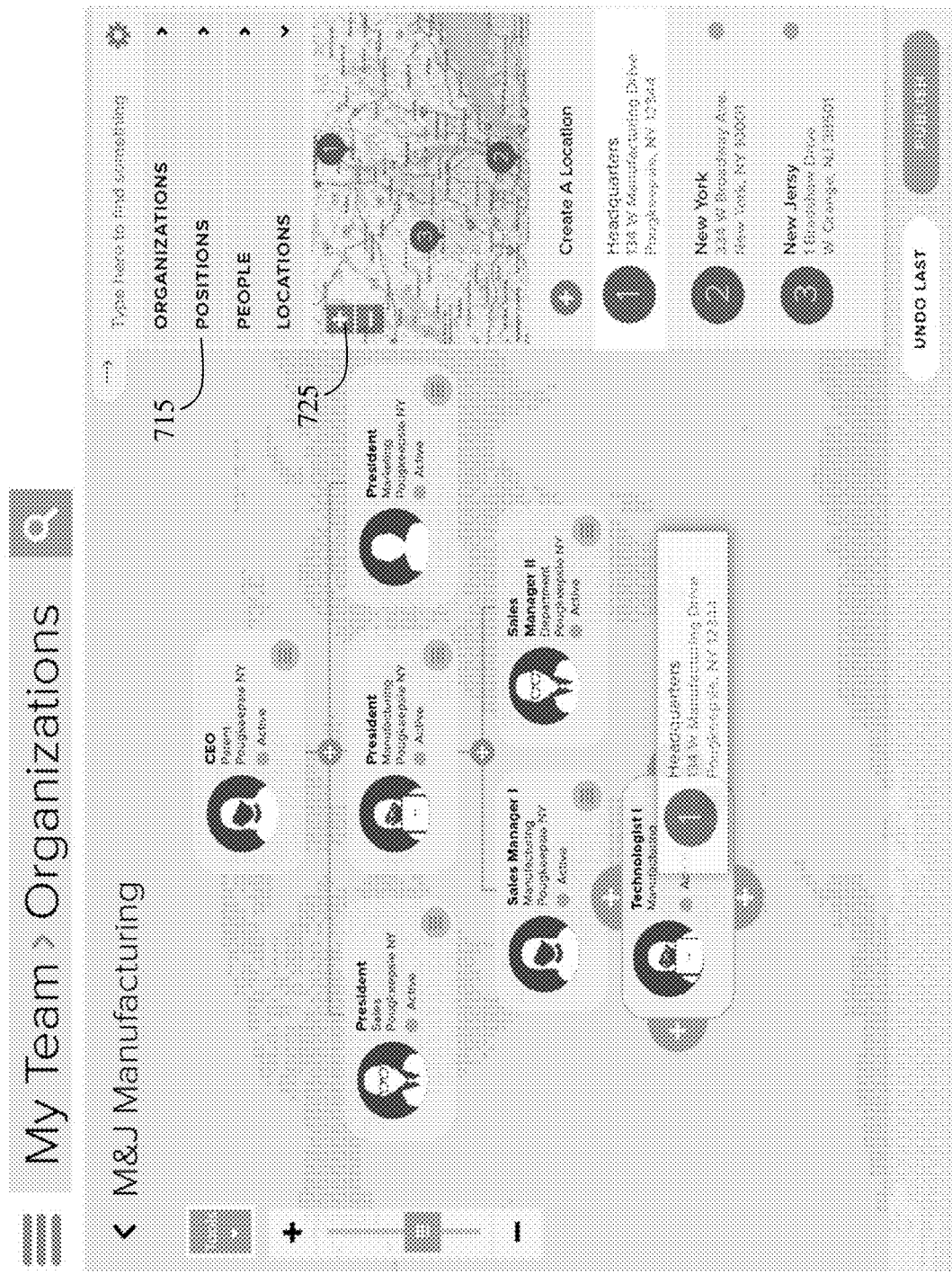

FIG. 10 shows another exemplary user interface in accordance with aspects of the invention. In this embodiment, the selected library category 715 is "locations". As with FIGS. 7-9, the user can select any of the library elements within the category, drag the elements into the organizational structure, and drop the library element with a specific location, whether it is within an existing node or to create a new node, to update the organizational structure. In this example, a map 725 can be created which visually shows the different locations of either organizations (e.g., headquarters, divisions, departments) or people, defined by name or, for example, position held within the company. The map 725 may provide this information using a numerical arrangement, e.g., 1, 2, 3, each of which are mapped to the node. Also, as each of the nodes are updated with location information, the map 725 can also be updated, with the information mapped into the graph database. Thus, any new information within the node will automatically be mapped to the node and shown visually.

FIG. 11 shows an analytical view of information in a user interface 1000. As described herein, by selecting the analytical action button on any of the expanded nodes, it is possible to visual analytics of the information related to the node. The analytics can include, for example, number of people in a corporation, number of divisions or departments with a corporation, number of active people within a division or department or other overview information shown in FIG. 11. This visualization of the node information can be generated from the graph database, as it includes all of the information and its relationships amongst the different nodes as described herein.

Figure 12:
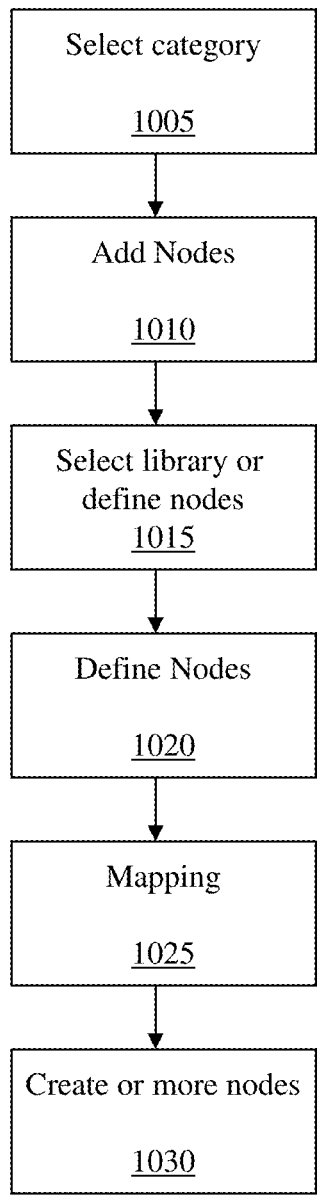
FIG. 12 depicts an exemplary flow for a process in accordance with aspects of the present invention.

FIG. 12 depicts an exemplary flow for a process in accordance with aspects of the present invention. The exemplary flow can be illustrative of a system, a method, and/or a computer program product and related functionality implemented on the computing system of FIG. 1, in accordance with aspects of the present invention. The computer program product may include computer readable program instructions stored on computer readable storage medium (or media). The computer readable storage medium include the one or more storage medium as described with regard to FIG. 1, e.g., non-transitory media, a tangible device, etc. The method, and/or computer program product implementing the flow of FIG. 12 can be downloaded to respective computing/processing devices, e.g., computing system of FIG. 1 as already described herein, or implemented on a cloud infrastructure as described with regard to FIG. 2. Accordingly, the processes associated with each flow of the present invention can be implemented by special purpose hardware-based systems that perform the specified functions or acts or carry out combinations of special purpose hardware and computer instructions.

FIG. 12 shows the creation of an organizational structure in accordance with aspects o the invention. In FIG. 12, at step 1005, an administrator initially selects a category shown, e.g., in FIG. 3. Illustratively, the administrator can create a new organization, add a location or create a position, to name a few. At step 1010, the administrator can add undefined nodes in a hierarchical tree structure in accordance with aspects of the invention. The hierarchical tree structure can include different relationships between the different nodes, which are mapped within a database. At step 1015, the administrator can select different libraries, in order to begin defining the nodes. These libraries can be, for example, organizations, persons, locations, etc. At step 1020, the administrator can select different elements within the library to define the nodes with information by a drag and drop activity of such elements. As an alternative approach, the administrator can manually enter information into each of the nodes by using, e.g., a fillable form template. At step 1025, as the different elements are dropped into the nodes or manually entered by the administrator, they are mapped to the nodes within a database. The different information within the nodes are also mapped to information with other nodes, to create the relationships that are visualized in the hierarchical tree structure. At step 1030, the administrator can create new nodes or new relationships between existing defined and/or undefined nodes by selecting specific nodes, and dragging and dropping the selected nodes to other locations within the hierarchical tree structure. These new relationships will then be mapped within the database.

The foregoing examples have been provided merely for the purpose of explanation and are in no way to be construed as limiting of the present invention. While aspects of the present invention have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although aspects of the present invention have been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of managing organizational structures, comprising:
   visually representing an organizational structure with movable and definable nodes provided in a hierarchical format, which is generated in a user interface of a computing system;
   mapping, within a database, relationships of the movable and definable nodes and information therein based on visual connections within the hierarchical format displayed on the user interface; and
   updating the database with newly mapped relationships between the movable and definable nodes as the movable and definable nodes are moved into different locations with respect to each other within the hierarchical format, wherein the movable and definable nodes are initially undefined nodes, and subsequently populated with information, via action menus included in each of the undefined nodes, to create the movable and definable nodes, and wherein connections between the movable and definable nodes are created and displayed in the user interface using at least four tabs located on respective sides of each of the nodes, each node including a first tab on a top portion of the node, a second tab on one side portion of the node, a third tab on an opposite side portion of the node, and a fourth tab on a bottom portion of the node, wherein the first tab is structured to permit creating a connection to a new parent node representing a position, a person or an organization on a higher level of the hierarchical format, wherein the second and third tabs are structured to permit creating connections to add a colleague in the organization by creating a new sibling node on a same level of the hierarchical format, and wherein the fourth tab is structured to permit generating a report regarding information in the node.

2. The method of claim 1, wherein:
the information populated by the user is structured information for each movable and definable nodes.

3. The method of claim 2, wherein the structured information includes library elements of predefined library categories.

4. The method of claim 3, wherein the library elements are provided in fillable fields and mapped to the predefined library categories within the database.

5. The method of claim 2, wherein the movable and definable nodes are created using a library of defined categories, and populated with library elements mapped in the database to the library categories.

6. The method of claim 5, wherein the library elements are structured to be dragged and dropped into any of the movable and definable nodes.

7. The method of claim 6, wherein the library elements are mapped to the movable and definable nodes which they populate.

8. The method of claim 1, wherein the movable and definable nodes within the hierarchical format are movable to different locations by a select, drag and drop action with new relationships between the movable and definable nodes being automatically created and updated within the database corresponding to a visual representation of the connections within the hierarchical format.

9. The method of claim 1, wherein new nodes are created above, below or at sides of an existing node by a click action of the existing node.

10. The method of claim 1, wherein each of the movable and definable nodes are expandable or contractable to show a different amount of information within each of the movable and definable nodes.

11. The method of claim 1, wherein the hierarchical format is expandable or collapsible by selecting an action button provided on selected nodes.

12. A computer system for modeling or building an organizational structure, comprising:
a hardware memory device that stores program instructions; and
a processor that executes the program instructions and causes the computer system to:

represent a position, a person or an organization as a node in a hierarchical format on a user interface, which is visual representative of the organizational structure on the user interface:

build the organizational structure by permitting drag and drop actions on the user interface of library elements into the hierarchical format as new nodes or updating existing nodes; and view the organization structure on the user interface from a plurality of perspectives as relationships between the nodes, wherein the plurality of perspectives include formal and informal relationships represented by connections of the nodes within the hierarchical format, wherein connections between the nodes are created and displayed in the user interface using at least four tabs located on respective sides of each of the nodes, each node including a first tab on a top portion of the node, a second tab on one side portion of the node, a third tab on an opposite side portion of the node, and a fourth tab on a bottom portion of the node, wherein the first tab is structured to permit creating a connection to a new parent node representing a position, a person or an organization on a higher level of the hierarchical format, wherein the second and third tabs are structured to permit creating connections to add a colleague in the organization by creating a new sibling node on a same level of the hierarchical format, and wherein the fourth tab is structured to permit generating a report regarding information in the node.

13. The computer system of claim 12, wherein the processor that executes the program instructions further causes the computer system to add a node in the hierarchical format which is one of a parent, a child or a sibling to the node.

14. The computer system of claim 13, wherein the added node is representative of one of:
a parent of the node, by dropping the added node on top of the node;
a child of the node, by dropping the added node at a bottom of the node; and
a sibling of the node, by dropping the added node at a same level as the node.

15. The computer system of claim 12, wherein the processor that executes the program instructions further causes the computer system to map relationships of the nodes in a database, based on a relationship of the nodes in the hierarchical format.

16. The computer system of claim 12, wherein the library elements are associated with categories and the nodes are related to the categories.

17. The computer system of claim 12, wherein the library elements are predefined elements associated with a particular library category.

18. A computer program product comprising computer readable program instructions stored on non-transitory computer readable storage medium, the computer readable program instructions causing a computing device to:
create movable and definable nodes in a hierarchical format using library elements stored in a database or entered by a user and which is representative of an organizational structure;
visually represent the movable and definable nodes in a hierarchical format in a user interface of a computing system;
map with a database relationships of the movable and definable nodes and the library elements based on visual connections of each of the movable and definable nodes within the hierarchical format; and update the database with new relationships between the movable and definable nodes as the movable and definable nodes are moved into different locations with respect to each other within the hierarchical format, wherein the movable and definable nodes are initially undefined nodes placed within the hierarchical format, and subsequently populated with information, via action menus included in each of the undefined nodes, to create the movable and definable nodes, and wherein connections between the movable and definable nodes are created and displayed in the user interface using at least four tabs located on respective sides of each of the nodes, each node including a first tab on a top portion of the node, a second tab on one side portion of the node, a third tab on an opposite side portion of the node, and a fourth tab on a bottom portion of the node, wherein the first tab is structured to permit creating a connection to a new parent node representing a position, a person or an organization on a higher level of the hierarchical format, wherein the second and third tabs are structured to permit creating connections to add a colleague in the organization by creating a new sibling node on a same level of the hierarchical format, and wherein the fourth tab is structured to permit generating a report regarding information in the node.

19. The computer program product of claim 18, wherein:

the library elements are mapped to predefined library categories;

the library elements are operable to be dragged and dropped into any of the movable and definable nodes to define information within the movable and definable nodes;

each of the movable and definable nodes are expandable or contractable to show a different amount of information within each of the movable and definable nodes; and the hierarchical format is expandable or collapsible by selecting an action button provided on selected ones of the movable and definable nodes.

20. The computer program product of claim 19, wherein the movable and definable nodes within the hierarchical format are movable to different locations by a select, drag and drop action with new relationships between the movable and definable nodes being automatically created and updated within the database corresponding to a visual representation of the connections within the hierarchical format.

* * * * *